US009429143B2

(12) United States Patent
Lee

(10) Patent No.: US 9,429,143 B2
(45) Date of Patent: Aug. 30, 2016

(54) WIND POWER GENERATION UNIT, WIND FARM, AND ARRANGEMENT STRUCTURE AND CONTROL METHOD OF THE SAME

(71) Applicant: DOOSAN HEAVY INDUSTRIES & CONSTRUCTION CO., LTD., Gyeongsangnam-do (KR)

(72) Inventor: Ik Hyung Lee, Seoul (KR)

(73) Assignee: DOOSAN HEAVY INDUSTRIES & CONSTRUCTION CO., LTD. (KR)

( * ) Notice: Subject to any disclaimer, the term of this patent is extended or adjusted under 35 U.S.C. 154(b) by 67 days.

(21) Appl. No.: 14/444,319

(22) Filed: Jul. 28, 2014

(65) Prior Publication Data
US 2015/0233356 A1 Aug. 20, 2015

(30) Foreign Application Priority Data

Feb. 20, 2014 (KR) .......................... 10-2014-0019744

(51) Int. Cl.
*F03D 9/00* (2016.01)
(52) U.S. Cl.
CPC ..................... *F03D 9/005* (2013.01)
(58) Field of Classification Search
CPC ..... Y02E 10/723; Y02E 10/725; Y02E 10/72; Y02E 10/74; H02P 2009/004
USPC ...................................... 290/44, 55
See application file for complete search history.

(56) References Cited

U.S. PATENT DOCUMENTS

| 4,159,427 A * | 6/1979 | Wiedemann | B63H 13/00 290/55 |
|---|---|---|---|
| 6,157,088 A * | 12/2000 | Bendix | E04H 12/085 290/44 |
| 7,025,567 B2 * | 4/2006 | Wobben | F03D 7/0224 415/118 |
| 2006/0131889 A1 | 6/2006 | Corten et al. | |
| 2008/0093861 A1* | 4/2008 | Friesth | F03D 1/001 290/55 |
| 2011/0175356 A1* | 7/2011 | Nielsen | F03D 7/0296 290/44 |
| 2012/0169053 A1* | 7/2012 | Tchoryk, Jr. | G01P 5/26 290/44 |
| 2012/0200086 A1* | 8/2012 | Kang | F03D 7/048 290/44 |

(Continued)

FOREIGN PATENT DOCUMENTS

FR 2868483 A1 10/2005
JP 2001-165032 6/2001

(Continued)

OTHER PUBLICATIONS

Extended European Search Report dated Jun. 22, 2015 in corresponding European Patent Application No. 14179350.5-1607.

(Continued)

*Primary Examiner* — Tulsidas C Patel
*Assistant Examiner* — Charles Reid, Jr.
(74) *Attorney, Agent, or Firm* — Baker & McKenzie LLP

(57) ABSTRACT

A wind farm includes a plurality of wind power generation units each including a rotation axis, a hub, at least two airfoil blades, a pitch control system and a yaw control system. At least two first-direction wind power generation units are spaced apart longitudinally from each other along a prevailing energy wind direction at a predetermined interval and whose blades are rotated in a same direction. At least one second-direction wind power generation unit that is located between the first-direction wind power generation units and has blades rotating in an opposite direction to a rotational direction of the blades of the first-direction wind power generation units.

13 Claims, 31 Drawing Sheets

(56) References Cited

U.S. PATENT DOCUMENTS

| | | | |
|---|---|---|---|
| 2012/0201677 A1* | 8/2012 | Krishnan | B66C 23/207 416/9 |
| 2012/0242088 A1* | 9/2012 | Raz | F03B 17/061 290/55 |
| 2012/0248772 A1* | 10/2012 | Shigemizu | H02P 9/04 290/44 |
| 2012/0256423 A1 | 10/2012 | Liu | |
| 2013/0099497 A1* | 4/2013 | Bowyer | F03D 7/0204 290/44 |
| 2013/0127173 A1 | 5/2013 | Lee et al. | |

FOREIGN PATENT DOCUMENTS

| | | |
|---|---|---|
| KR | 1020110052285 A | 5/2011 |
| KR | 101179884 B1 | 4/2012 |
| KR | 1020130076929 A | 7/2013 |

OTHER PUBLICATIONS

Notice of Allowance issued on Oct. 24, 2014 for Korean Patent Application No. 10-2014-0019744.

* cited by examiner

C1

C2

C3

B1

B2

B3

A1

A2

A3

B1

A1

C1

B1

A1

A1-1

A1

A2 wind

C1

C2

B1

B2

A1

A2 wind

B1'

A1

C1

B1'

A1

C1-1

A1

A2'

WIND POWER GENERATION UNIT, WIND FARM, AND ARRANGEMENT STRUCTURE AND CONTROL METHOD OF THE SAME

CROSS-REFERENCE TO RELATED APPLICATIONS

This application claims priority to Korean Application No. 10-2014-0019744, filed Feb. 20, 2014, the contents of which are incorporated herein in their entirety.

BACKGROUND

The present disclosure relates to a wind power generation unit, a wind farm which improves the degree of agglomeration, and arrangement structure and control method of the same, and more particularly, to a wind power generation unit, a wind farm, and arrangement structure and control method of the same, which facilitate arrangement of more wind power generation units in the same area by minimizing vortex interaction between the wind power generation units.

In wind power generation, a power generation facility converts kinetic energy of wind into rotational energy of blades and produces electricity by operating an electric generator inside a nacelle.

Referring to FIG. 1, a wind farm includes a plurality of wind power generation units whose blades rotate in the clockwise direction and are arranged at sufficient longitudinal intervals and transversal intervals from each other in order to avoid a mutual interference. Therefore, an initial task in creating a wind farm including dozens or hundreds of wind power generation units is to secure enough land to arrange the wind power generation units at sufficient distances from each other.

It can be considered to narrow the distance between the wind power generation units in order to increase power capacity per land unit, but it may cause a vibration of the blades due to vortex interaction generated by rotation of the blades of each wind power generation unit. Because the lifespan of the wind power generator is reduced due to such a vibration, in reality, there is a limitation in narrowing the distance between the wind power generation units.

In more detail, between the wind power generation units neighboring in a longitudinal (back and forth) direction as shown in FIG. 2, a rear vortex moves in the opposite direction to the rotational direction of the blades while wind passing the blades collides with the blades. That is, in the case of A1 of FIG. 2, while the blades rotate in the clockwise direction, a rear vortex is generated in the counterclockwise direction and is transferred to B1.

FIG. 3 illustrates an influence of the rear vortex more concretely. As shown in FIG. 3, the wind power generation units of A1, B1 and C1 are all arranged in the longitudinal (back and forth) direction and all rotate in the clockwise direction. In this instance, all of the wind power generation units generate the rear vortex in the counterclockwise direction, and the rear vortex are overlapped and gradually amplified from A1 toward B1 and C1. As described above, in the conventional wind farm, the wind power generation units are arranged in the longitudinal (back and forth) direction at a sufficient distance from each other to avoid such an influence of the rear vortex in the longitudinal (back and forth) direction.

Meanwhile, between wind power generation units which are adjacent to one another in a transversal (lateral) direction, a vortex which rotates in the opposite direction to a rotational direction of the blades is generated when wind passing the blades collides against the blades. That is, in FIG. 5, a vortex directing downward is generated at the right side of A1 but a vortex directing upward is generated at the left side of A2. Therefore, mutual collision of the vortexes causes a vibration of the blades.

In more detail, conventionally, in case that a plurality of wind power generation units are installed, a longitudinal (back and forth) interval which is about seven times the rotor diameter must be maintained in order to prevent an efficiency drop and a vibration of the wind power generation units installed at the rear due to a slipstream flow generated by the wind power generation units installed at the front, and a transversal (lateral) interval which is about four times the rotor diameter must be maintained in order to prevent an efficiency drop and a vibration of wind power generation units due to a vortex interaction generated by the wind power generation units installed laterally, and hence, there is a limitation in increasing the degree of agglomeration of the wind power generation units.

SUMMARY

Accordingly, the present disclosure has been made to address the above-mentioned problems, and it is an object of the present disclosure to provide a wind farm which improves the degree of agglomeration, and arrangement structure and control method of the same which enhance land availability by increasing the number of wind power generation units installed per unit area in the wind farm and extend the lifespan of the wind power generation units by reducing an influence by mutual interaction between vortexes.

In an embodiment, there is provided a wind farm including: at least one first-direction (for instance, clockwise direction) wind power generation unit; and at least one second-direction (for instance, counterclockwise direction) wind power generation whose blades are rotated in the opposite direction to a rotational direction of blades of the first-direction wind power generation unit, wherein the first-direction wind power generation unit and the second-direction wind power generation unit are spaced apart from each other at a predetermined direction in a transversal or longitudinal direction and alternately arranged adjacent to each other in such a manner that the blades of the first-direction wind power generation unit and the blades of the second-direction wind power generation unit are rotated in the opposite direction to each other in order to avoid mutual vortex interaction, so as to prevent a reduction of aerodynamic efficiency and generation of aerodynamic vibration by vortexes generated from the blades.

Embodiments of the disclosure may facilitate a denser arrangement by reducing the influence of the transversal or longitudinal vortexes between the neighboring wind power generation units. Therefore, embodiments of the disclosure can alleviate or solve the problem of life-shortening due to the vibration by the vortexes and enhance land availability.

Moreover, when the vortex is generated unavoidably in spite of the reduction of the influence of the vortex, embodiments of the disclosure can limit or prevent life-shortening from an excessive vibration through pitch control and yaw control according to the intensity of the vortex.

In more detail, when the rotational direction is opposed to the wind power generation unit installed at the front and pitch control and yaw control are carried out in such a way as to be fit to a vector component of an inlet flow which is changed according to a longitudinal (back and forth) interval with the wind power generation unit installed at the front, embodiments of the disclosure can reduce or minimize an efficiency drop and a vibration by a slipstream flow generated by the wind power generation unit installed at the front just through the longitudinal (back and forth) interval which is less than about two to seven times the rotor diameter.

Furthermore, because the rotational direction is opposed to the wind power generation unit installed laterally and a range of a flow interaction changed according to the transversal (lateral) interval from the wind power generation units installed laterally can be minimized using pitch control and yaw control, embodiments of the disclosure can effectively use the rotational flow generated by the wind power generation units installed laterally and reduce or minimize an efficiency drop and a vibration generated by the flow interaction through the transversal (lateral) interval which is less than about two to four times the rotor diameter, so as to increase or maximize an electrical output in the wind farm of a limited area.

In brief, in the wind farm in which at least two wind power generation units having a horizontal rotation axis are installed, the flow interaction between the wind power generation units is reduced or minimized through the selection of rotational directions of the blades (clockwise or counterclockwise), the yaw control which controls a lateral angle of a rotation axis of a rotor according to a change in wind direction, and pitch control to control angles of the blades. So, the number of the wind power generation units installed in the limited area of the wind farm can be increased or maximized using the flow created by surrounding wind power generators without installing additional specific facilities or devices.

BRIEF DESCRIPTION OF THE DRAWINGS

The above and other objects, features and advantages of the present disclosure will be apparent from the following detailed description of the embodiments of the present disclosure in conjunction with the accompanying drawings, in which.

DETAILED DESCRIPTION

Reference will be now made in detail to embodiments of the present disclosure with reference to the attached drawings.

Figure 7:
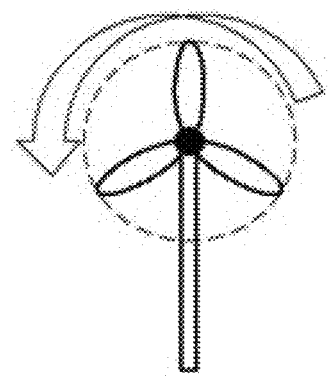
FIG. 7 is an arrangement diagram of wind power generation units arranged in a longitudinal direction in a wind farm according to an embodiment of the present disclosure.
Figure 7:
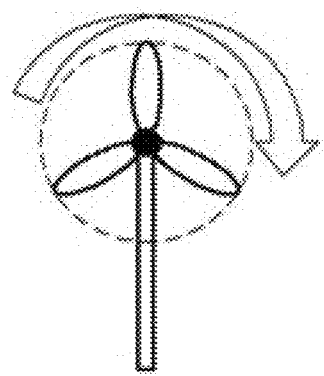
Figure 7:
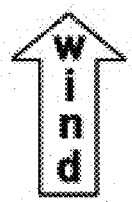

FIG. 7 illustrate arrangement structures of a wind farm according to an embodiment of the present disclosure. In the drawings, alphabet letters from A to E indicate rows and numbers from 1 to 5 indicate columns.

Superscripts indicate wind power generation units which respectively have blades rotating in the opposite direction, for instance, in the counterclockwise direction, to the rotational direction, for instance to the clockwise direction, of blades of the benchmark wind power generation unit.

That is, based on A1, B1' indicates a wind power generation unit which is adjacent in the longitudinal (back and forth) direction and rotates in the opposite direction, and A2' indicates a wind power generation unit which is adjacent in the transversal (lateral) direction and rotates in the opposite direction.

In the wind farm, the wind power generation units are spaced apart from each other in the longitudinal and transversal directions, and the wind farm includes at least one first-direction wind power generation unit and at least one second-direction wind power generation unit.

Moreover, in order to enhance a space efficiency and minimize (or reduce) superposition and interaction of vortexes between the wind power generation units, the first-direction wind power generation unit and the second-direction wind power generation unit which is adjacent to the first-direction wind power generation unit and rotates in the opposite direction to the rotational direction of the first-direction wind power generation unit are alternately arranged.

When wind power generation units whose blades rotate in the same direction are arranged adjacent to each other, an excessive vibration is created by superposition and interaction of vortexes, and it may reduce the lifespan of the wind power generation units. However, when wind power generation units whose blades rotate in the opposite direction to each other are alternately arranged adjacent to each other, it can enhance space availability and reduce life-shortening of the wind power generation units caused by the vibration by offsetting superposition of the vortexes and minimizing interaction.

That is, when the first-direction wind power generation units and the second-direction wind power generation units are alternately arranged adjacent to each other in longitudinal and/or transversal directions, the blades of the wind power generation units rotate in the opposite direction to each other so as to mutually reduce an influence of the vortexes generated from their blades.

Hereinafter, embodiments of the present disclosure will be described in more detail in various cases.

Figure 2:
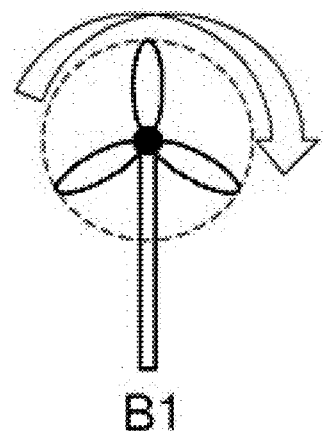
FIG. 2 is an epitomical diagram of wind power generation units neighboring in a longitudinal direction in a wind farm.
Figure 2:
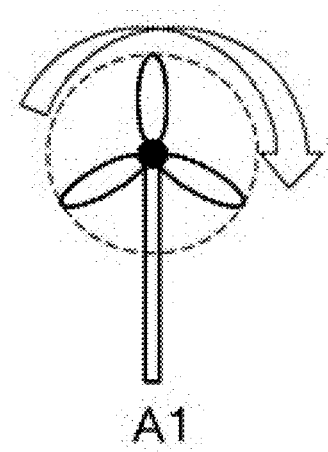
Figure 2:
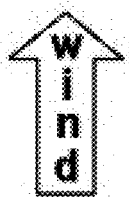

First, referring to FIGS. 2 to 4, problems caused when the wind power generation units which have the same rotational direction are arranged in the longitudinal (back and forth) direction will be described.

Figure 2A:
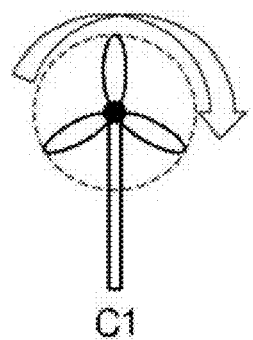
Figure 2A:
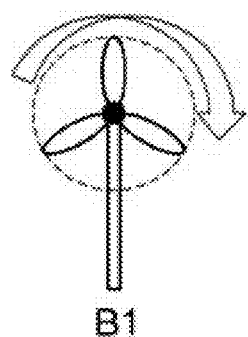
Figure 2A:
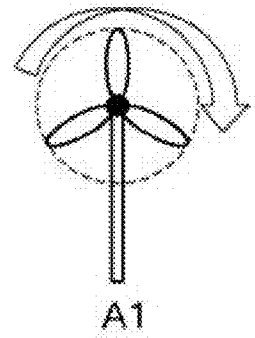
Figure 2A:
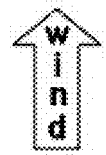

FIG. 2A shows an arrangement of the wind power generation units neighboring in the longitudinal (back and forth) direction in a wind farm, and first-direction wind power generation units A1, B1 and C are arranged in the longitudinal (back and forth) direction.

Figure 3:
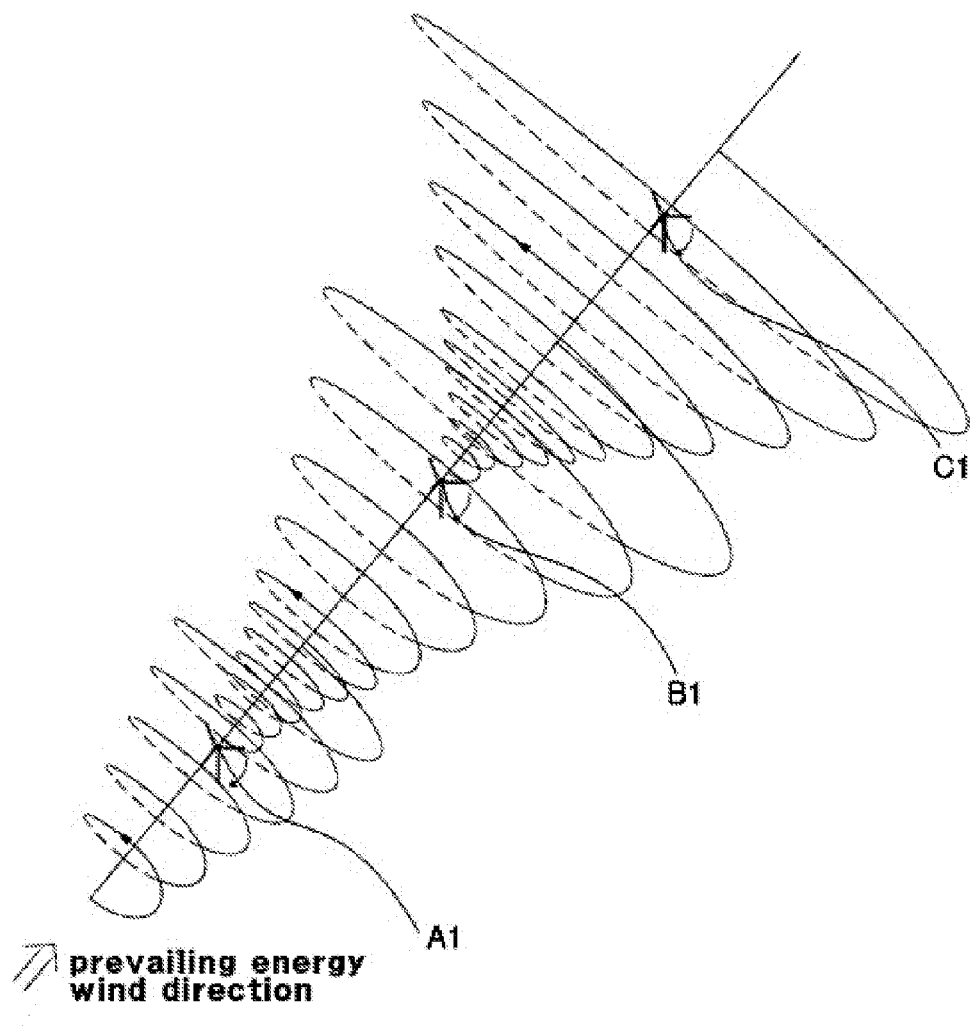
FIG. 3 is a conceptual diagram showing the intensity of a slipstream interaction of a longitudinal vortex of FIG. 2.

In FIG. 3, the wind power generation unit A1 which is installed in the first row in the prevailing energy wind direction does not have any strong slipstream flow because there is no wind power generation unit in front of the wind power generation unit installed in the first row, but a weak forward flow of a spiral form is generated in a subsonic flow field in the opposite direction (counterclockwise direction) to the rotational direction (clockwise direction) of the wind power generation units. Such a flow is converted into a strong spiral flow which rotates in the opposite direction to the rotational direction of the wind power generation unit while passing the wind power generation unit A1 which is installed in the first row, and the strong spiral flow becomes stronger while being introduced into the wind power generation unit B1 installed in the second row when the longitudinal (back and forth) interval between the wind power generation units is small. After that, the flow becomes still stronger in rotational force while passing the wind power generation unit B1 which is installed in the second row and rotates in the same direction, and then, is introduced into the wind power generation unit C1 which is installed in the third row.

Figure 4:
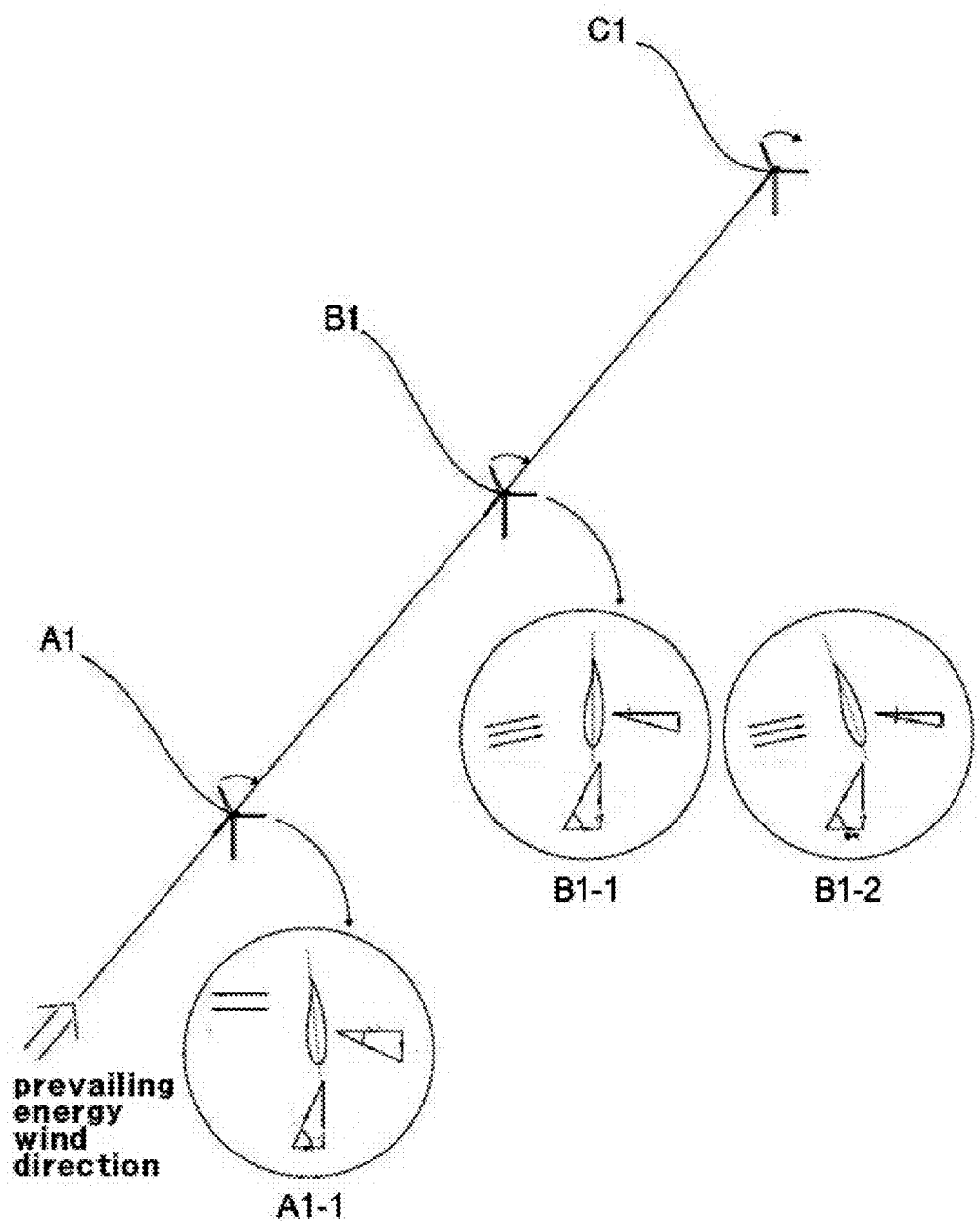
FIG. 4 is a speed and force diagram of wind power generation units neighboring in the longitudinal direction in a wind farm.
Figure 4A:
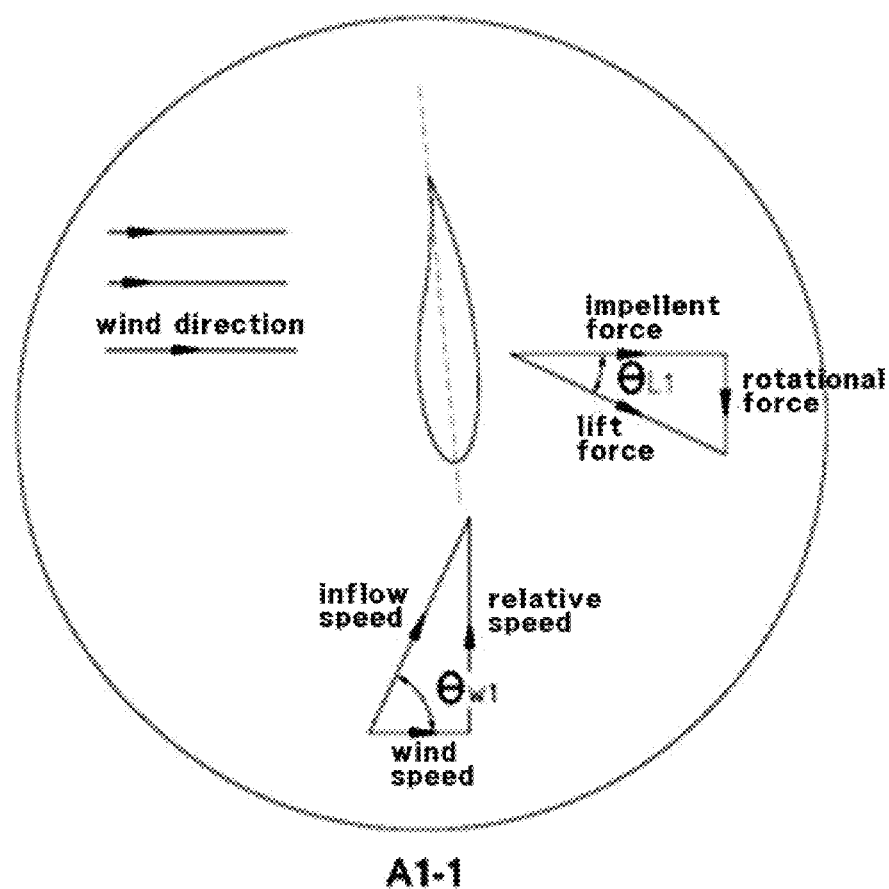
FIGS. 4A to 4C are enlarged views of A1-1, B1-1 and B1-2 of FIG. 4.
Figure 4B:
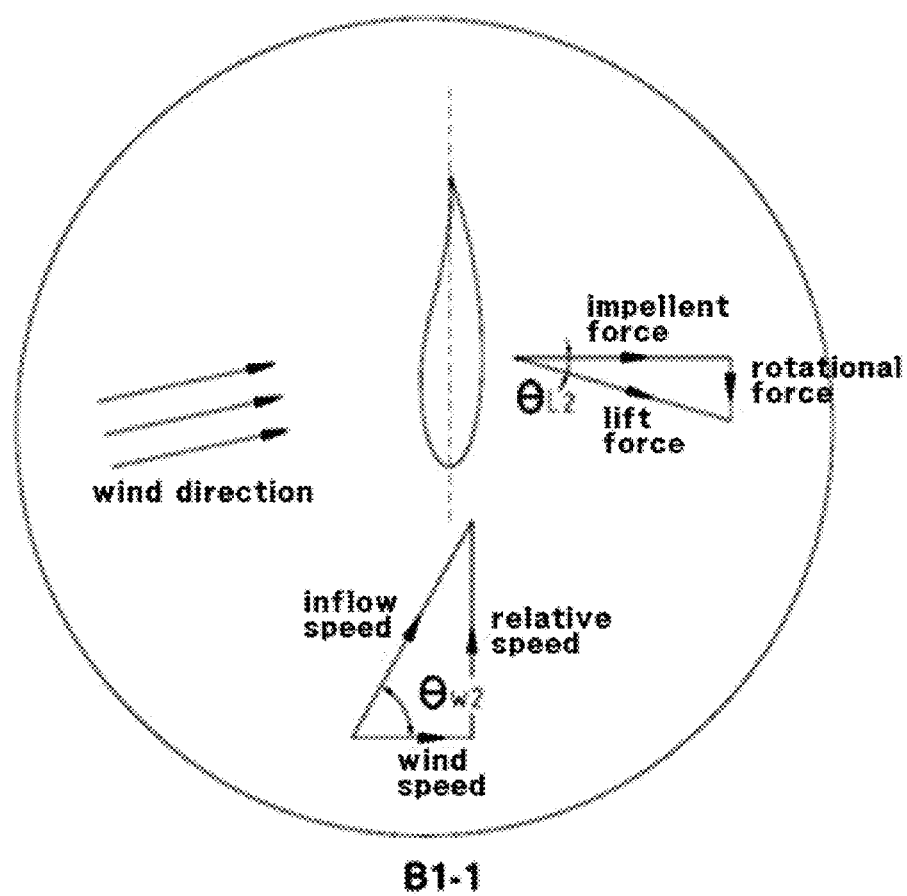

As shown in FIG. 4, the strong spiral flow which reaches the blades of the wind power generation unit B1 installed in the second row and rotates in the opposite direction to the rotational direction of the blades increases a relative speed generated by the rotation of the blades because containing a flow component which is vertical to a horizontal axis of the wind power generation unit, but a flow component which is parallel to the horizontal axis of the wind power generation unit is relatively decreased, such that an effective flow incident angle can be maintained only when an air foil pitch angle is adjusted to the rear of the wind power generation unit because $\theta_{w2}$ is increased more than $\theta_{w1}$ in FIGS. 4A and 4B.

In case of the wind power generation unit C1 which is installed in the third row, such a phenomenon is growing more due to the spiral flow rotating in the opposite direction to the rotational direction of the wind power generation unit in which the rotational force becomes stronger while passing the wind power generation unit B1 which is installed in the second row.

Figure 4C:
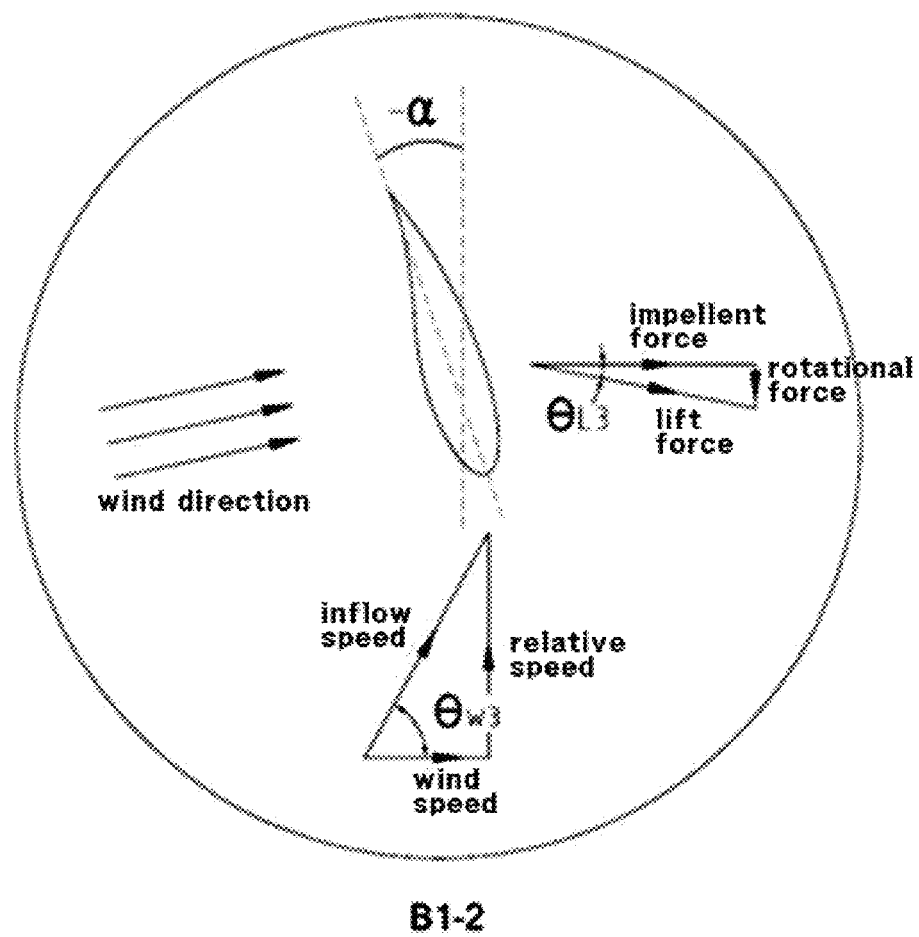

Therefore, as shown in FIG. 4C, in order to maintain the effective flow incident angle based on the blade section, a pitch angle must be adjusted to the rear of the wind power generation unit in such a manner that a pitch angle value becomes a negative number, namely, $-\alpha$, and then, a lift force of the blades works in the opposite direction, and finally, if aerodynamic efficiency drops remarkably or is severe, a rotational force is created in the opposite direction to the expected rotational direction so as to create a reverse rotation.

In order to prevent the reverse rotation, the existing flow incident angle must be maintained even though the flow incident angle is ineffective, but in this instance, an aerodynamic vibration is caused due to the deterioration of aerodynamic efficiency and discordance between an incident angle of the optimum flow and an incident angle of the actual flow in the airfoil blade section.

Figure 8:
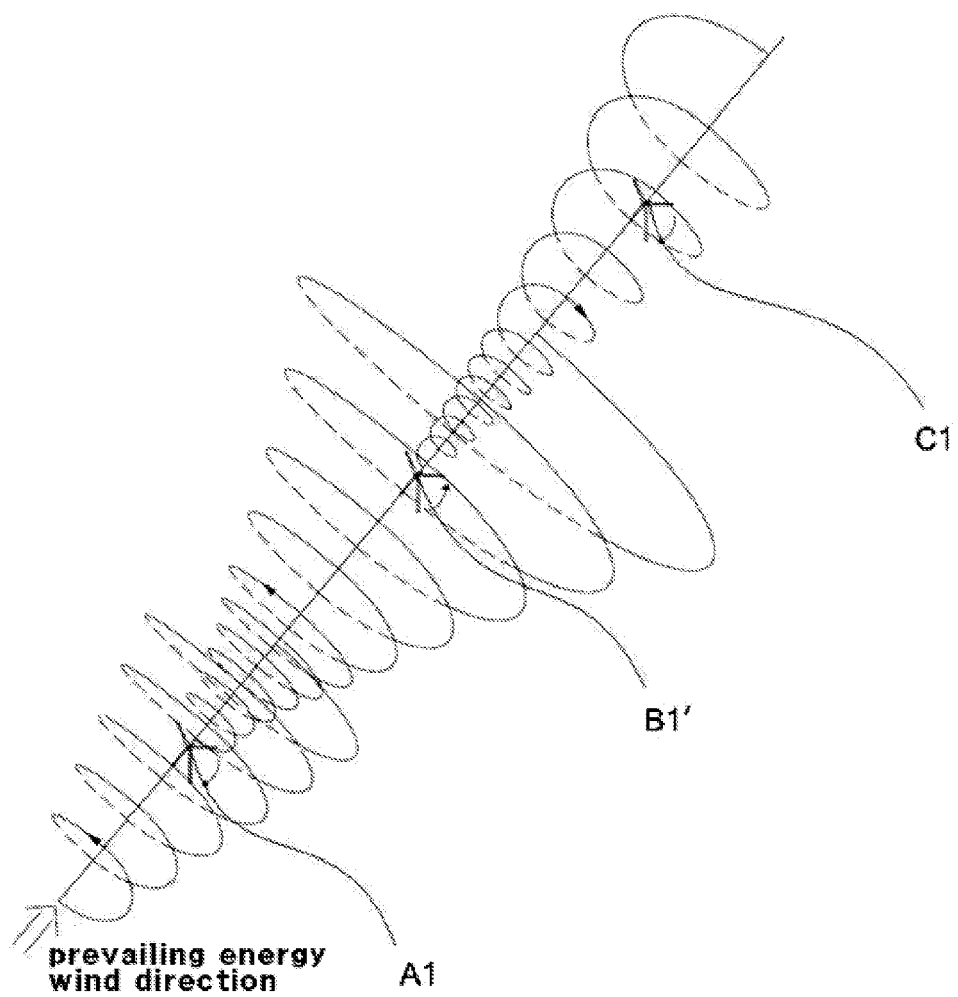
FIG. 8 is a conceptual diagram showing the intensity of a slipstream interaction of a longitudinal vortex according to an embodiment of the present disclosure.
Figure 9:
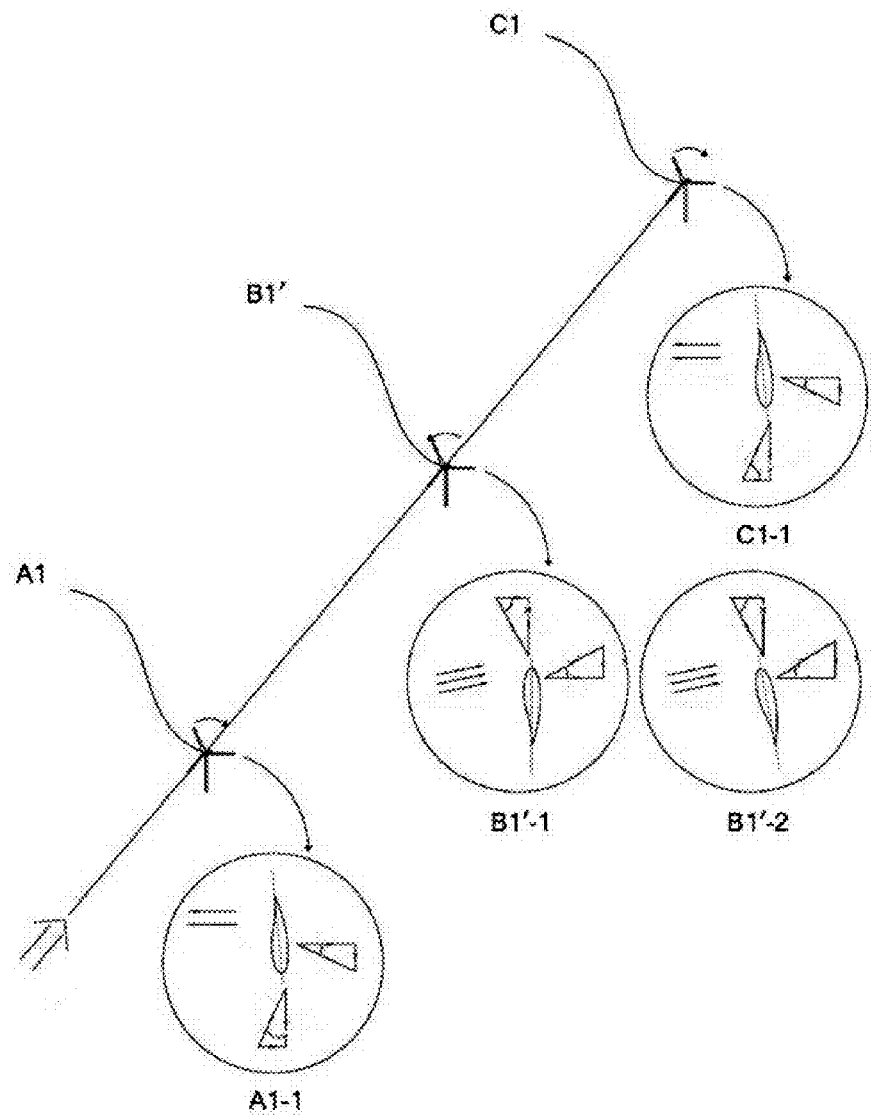
FIG. 9 is a speed and force diagram of wind power generation units neighboring in the longitudinal direction according to an embodiment of the present disclosure.

Moreover, FIGS. 7 to 9 show an arrangement structure of the wind power generation units according to embodiments of present disclosure, wherein wind power generation units whose blades are rotated in the opposite direction to each other are alternately arranged at a predetermined interval in the longitudinal (back and forth) direction.

Figure 7A:
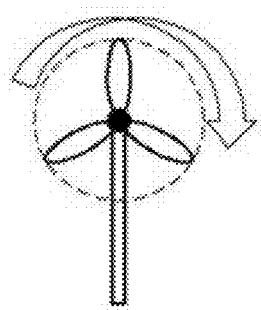
Figure 7A:
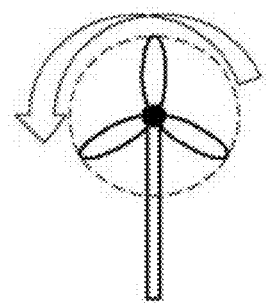
Figure 7A:
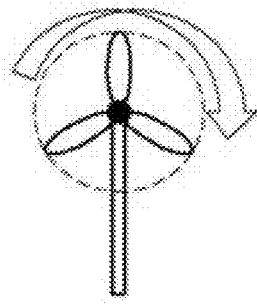
Figure 7A:
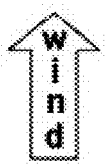

FIG. 7A is an arrangement diagram showing that the wind power generation units are installed in the longitudinal (back and forth) direction in the wind farm, wherein a second-direction wind power generation unit B1' is arranged at the rear of the first-direction wind power generation unit A1, and a first-direction wind power generation unit C1 is arranged at the rear of the second-direction wind power generation unit B1', such that the wind power generation units which are opposed to each other in rotational direction are arranged adjacent to each other in the longitudinal (back and forth) direction.

As shown in FIG. 8, the wind power generation unit A1 installed in the first row in the prevailing energy wind direction does not have any strong slipstream flow because there is no wind power generation unit in front of the wind power generation units installed in the first row, but a weak forward flow of a spiral form is generated in a subsonic flow field in the opposite direction to the rotational direction of the wind power generation units. Such a flow is converted into a strong spiral flow which rotates in the opposite direction to the rotational direction of the wind power generation unit while passing the wind power generation unit A1 which is installed in the first row, and the strong spiral flow becomes stronger while being introduced into the wind power generation unit B1' installed in the second row when the longitudinal (back and forth) interval between the wind power generation units is small. After that, the rotational direction of the flow is changed into the opposite direction while passing the wind power generation unit B1' which is installed in the second row and rotates in the opposite direction, and then, is introduced into the wind power generation unit C1 which is installed in the third row in a state where a rotational force of an outlet flow becomes weakened remarkably by an influence of an inlet flow which is opposed in the rotational direction, namely, in a state where the flow component in the horizontal direction is recovered.

Figure 9A:
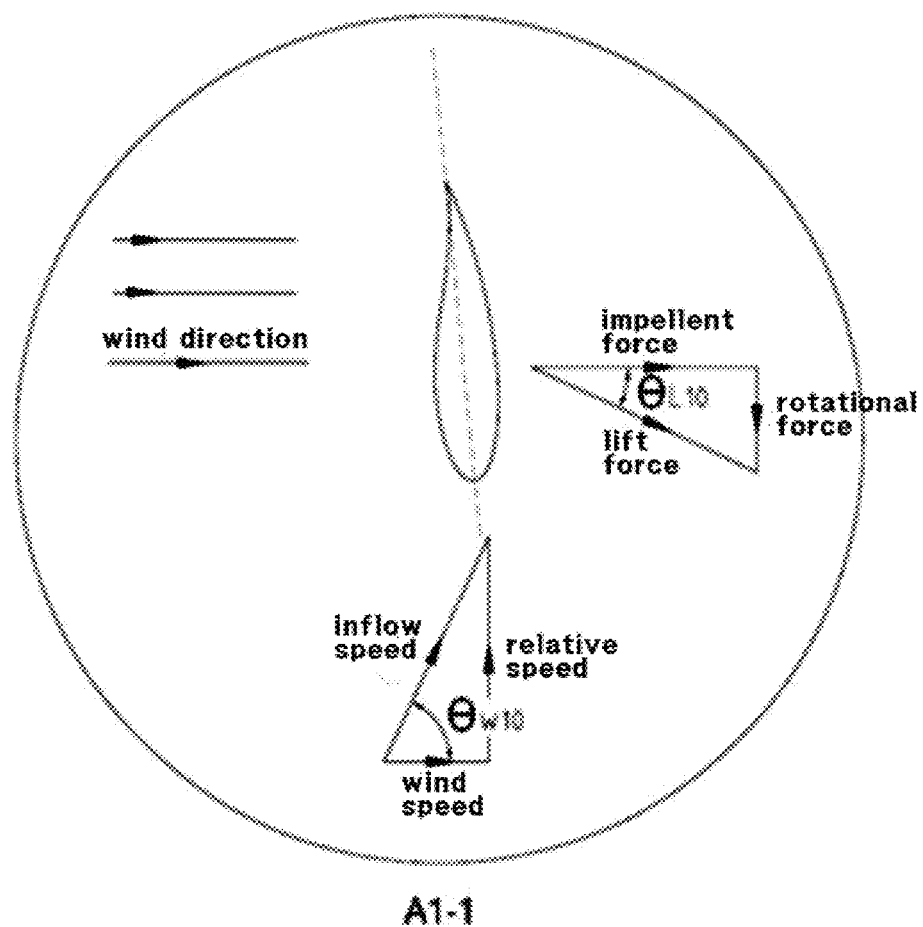
FIGS. 9A to 9D are enlarged views showing A1-1, B1'-1, B1'-2 and C1-1 of FIG. 9.
Figure 9B:
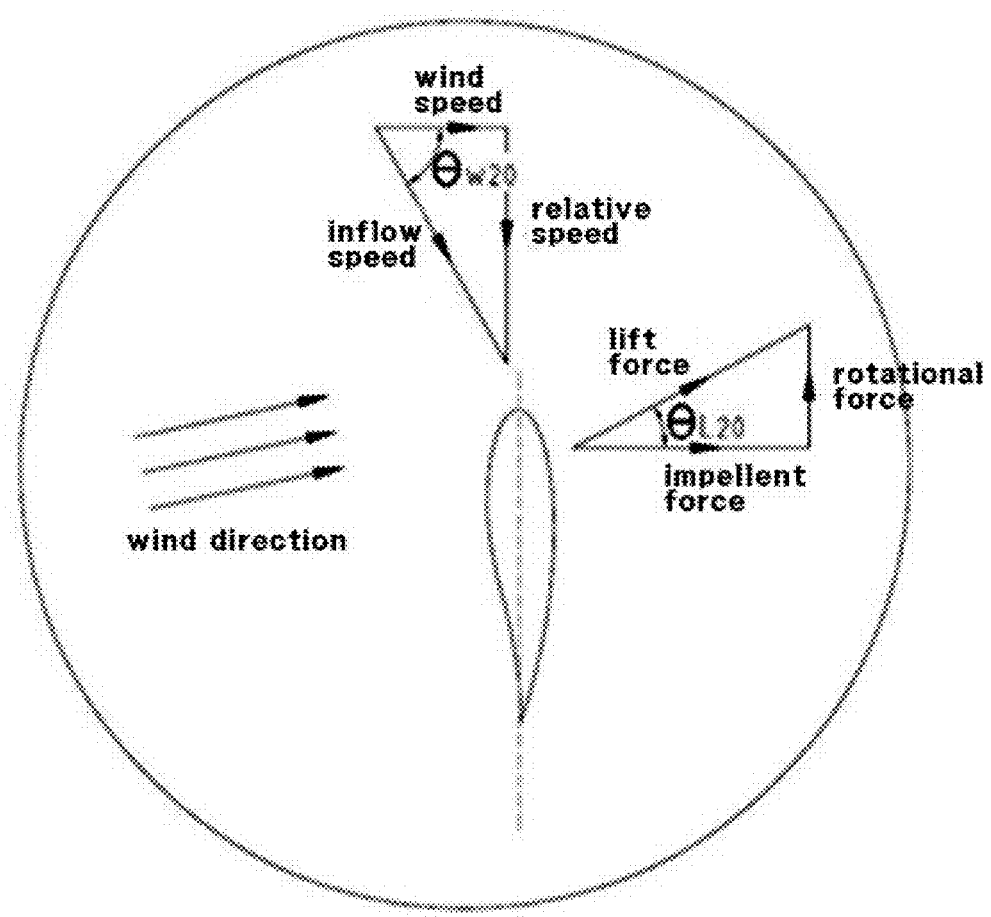
Figure 9C:
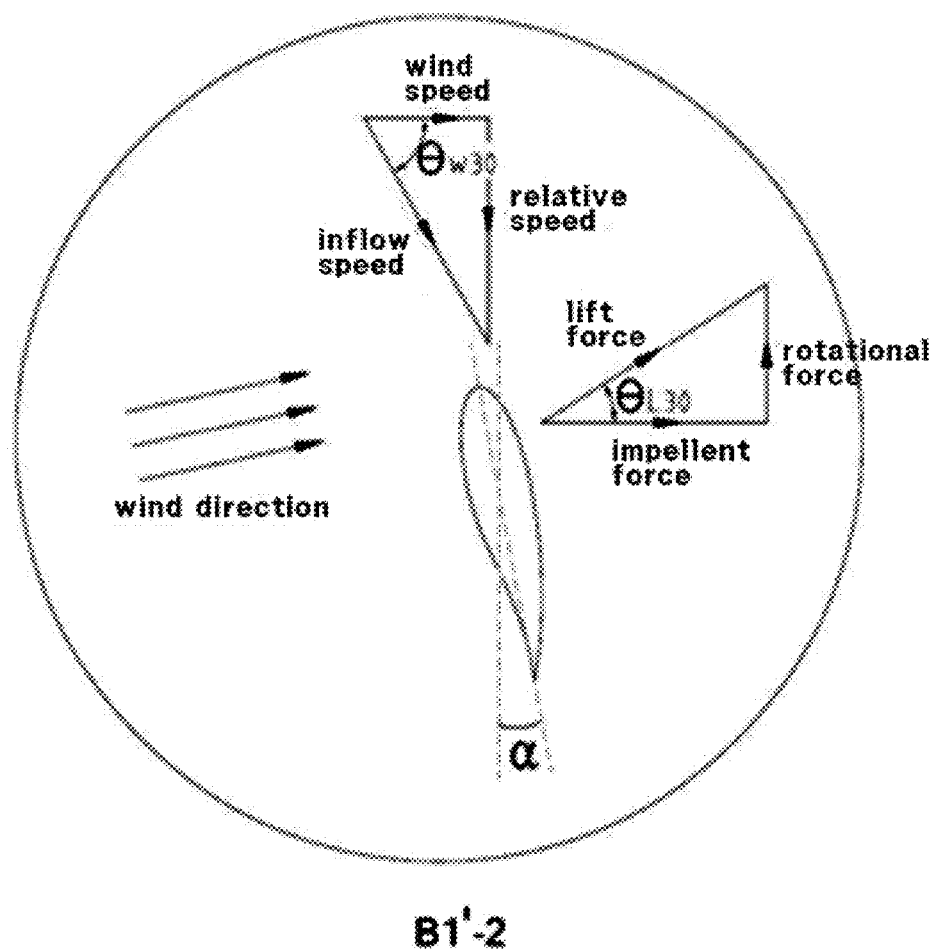
Figure 9D:
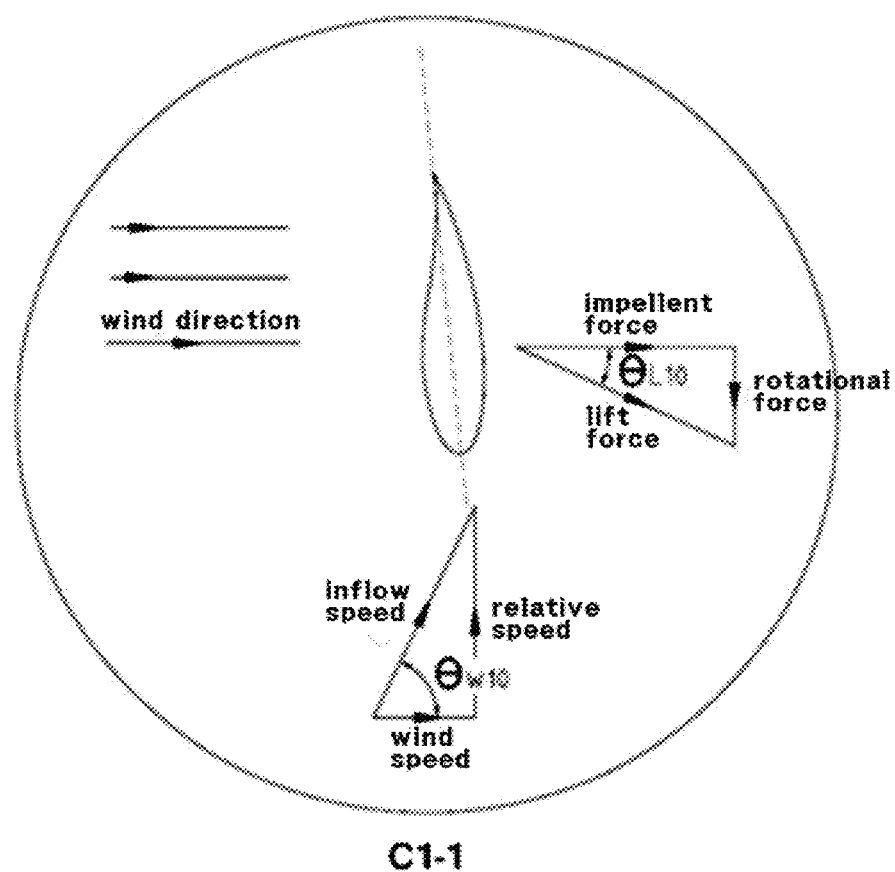

Because the blades of the wind power generation unit B1' which is installed in the second row is rotated in the opposite direction to the wind power generation unit installed at the front, as shown in FIG. 9, the slipstream flow which reaches the wind power generation unit B1' installed in the second row has the same rotational direction as the blades of the wind power generation unit B1', and a flow component which is vertical to a horizontal axis of the wind power generation unit containing the spiral flow decreases a relative speed generated by the rotation of the blades, but a flow component (wind speed) which is parallel to the horizontal axis of the wind power generation unit is relatively decreased, such that an effective flow incident angle can be maintained only when an airfoil pitch angle is adjusted to the front of the wind power generation unit as shown in FIG. 9C because $\theta_{w20}$ is decreased more than $\theta_{w10}$ in FIGS. 9A and 9B.

In case of the wind power generation unit C1 which is installed in the third row, such a phenomenon becomes weaker due to the spiral flow rotating in the opposite direction to the rotational direction of the wind power generation unit of the second row in which the rotational force is reduced while passing the wind power generation unit B1' which is installed in the second row, such that the spiral flow becomes similar to the incident flow of the wind power generation unit A1 installed in the first row and keeps the weakened state even after the wind power generation unit C1 installed in the third row.

Therefore, as shown in FIG. 9C, in order to maintain the effective flow incident angle based on the blade section, a pitch angle must be adjusted to the front of the wind power generation unit in such a manner that a pitch angle value becomes a positive number, namely, +α, and then, a lift force of the blades works in the forward direction, and finally, the blades generate a rotational force in the same direction as the expected rotational direction and some of aerodynamic efficiency can be partially recovered due to the forward rotation of the airfoil blade section.

In this instance, when pitch control is made in such a manner that an incident angle of the optimum flow and an incident angle of the actual flow accord with each other in the airfoil blade section, it can partially prevent deterioration in aerodynamic efficiency and prevent the aerodynamic vibration.

Additionally, differently from the wind power generation unit B1' installed in the second row, the wind power generation unit installed in the third row and the wind power generation units installed after the wind power generation unit of the third row, namely, after C1, are weakened in the spirally rotational strength of the inlet flow so as to minimize the influence of the slipstream of the wind power generation unit installed at the front, thus providing aerodynamic efficiency similar to that of the wind power generation unit A1 installed in the first row.

In conclusion, by the same token, the longitudinal (back and forth) arrangement of the wind power generation units which rotate in the same direction as the wind power generation units installed at the front must keep a sufficient longitudinal (back and forth) interval from the wind power generation units installed at the front, but the longitudinal (back and forth) arrangement of the wind power generation units which rotate in the opposite direction to the wind power generation units installed at the front can minimize the longitudinal (back and forth) interval so as to maximize the number of the wind power generation units installed in a limited wind farm area.

As described above, the wind power generation units whose blades are rotated in the opposite direction to each other are alternately arranged at the position where they are mutually adjacent in the longitudinal (back and forth) direction so as to minimize the longitudinal interval from the wind power generation unit and reduce the influence of the longitudinal vortexes between the neighboring wind power generation units, thus increasing space availability by narrowing the longitudinal interval between the wind power generation units.

Hereinafter, referring to FIGS. 5, 6, 10 and 11 which illustrate the influence of transversal (lateral) vortexes, an aspect of the present disclosure will be described.

Figure 5:
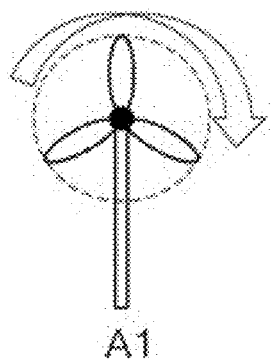
FIGS. 5 to 5A are epitomical diagrams of wind power generation units neighboring in a transversal direction in a wind farm.
Figure 5:
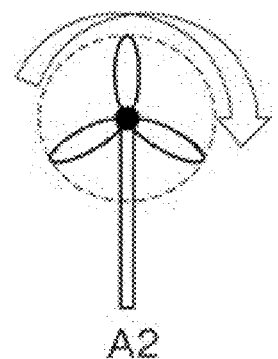
Figure 5:
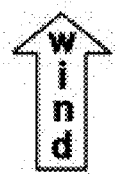
Figure 6:
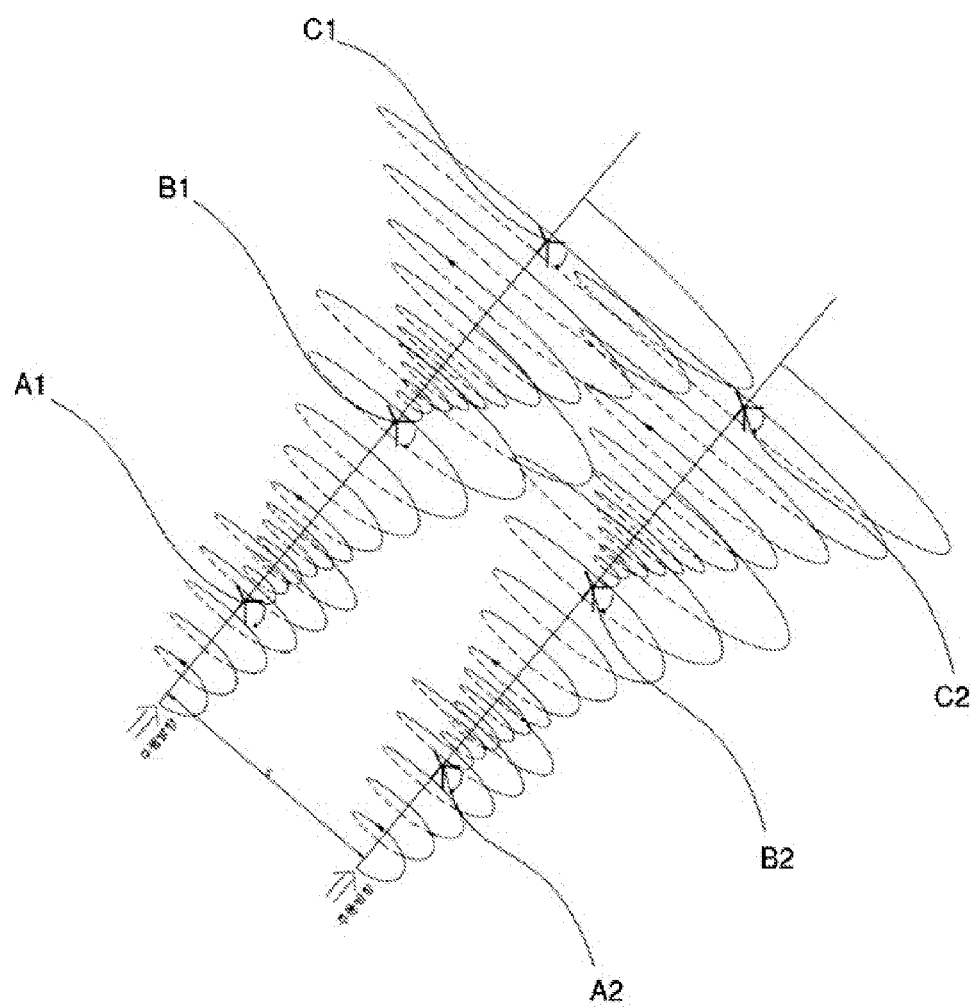
FIG. 6 is a conceptual diagram showing the intensity of a lateral interaction of transversal vortexes.

FIGS. 5 and 6 show a problem occurring when the wind power generation units having the same rotational direction are arranged in the transversal (lateral) direction.

Figure 5A:
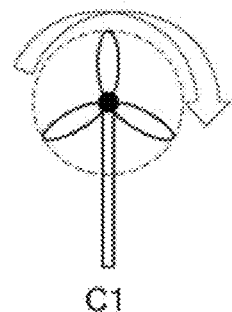
Figure 5A:
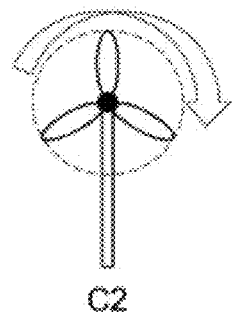
Figure 5A:
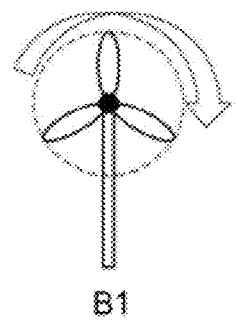
Figure 5A:
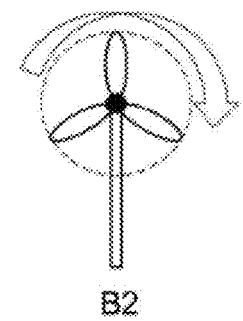
Figure 5A:
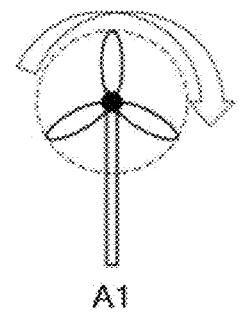
Figure 5A:
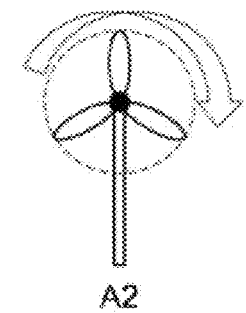
Figure 5A:
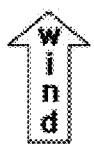

FIG. 5A shows an arrangement of the wind power generation units neighboring in the transversal (lateral) direction in the conventional wind farm, and first-direction wind power generation units A1, A2, B1, B2, C1 and C2 are arranged in the transversal (lateral) direction.

In FIG. 6, when the wind power generation units whose blades rotate in the same direction are arranged in a transversal (lateral) direction, a spiral flow which is opposed to the rotational direction of each wind power generation unit is generated at the rear of the wind power generation unit. If the transversal (lateral) interval from the wind power generation units is narrow, the spiral flow collides against laterally adjacent spiral flow and is changed into a unpredictable turbulence because the spiral flows get tangled with each other at the colliding faces due to the same rotational direction thereof, so that flow interaction is deepened and such a phenomenon continuously expands the influence of the slipstream to the wind power generation units which are installed in the next row so as to worsen the flow interaction.

Therefore, because such an arrangement has a bad influence on the aerodynamic efficiency and aerodynamic vibration of the wind power generation units, in order to achieve the expected aerodynamic efficiency and prevent vibration, the sufficient transversal (lateral) interval must be maintained.

Figure 10:
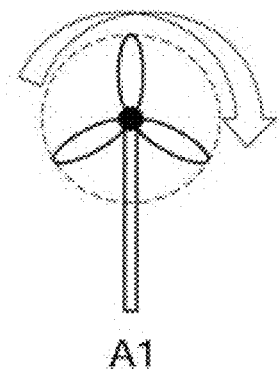
FIGS. 10 to 10A are transversal arrangement diagrams of the wind power generation units installed in the transversal direction in the wind farm according to an embodiment of the present disclosure.
Figure 10:
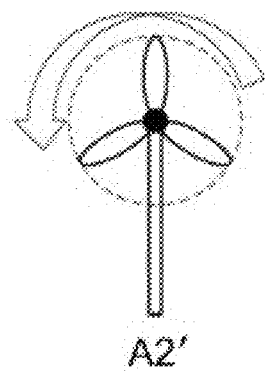
Figure 10:
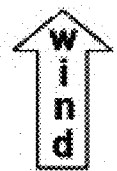
Figure 11:
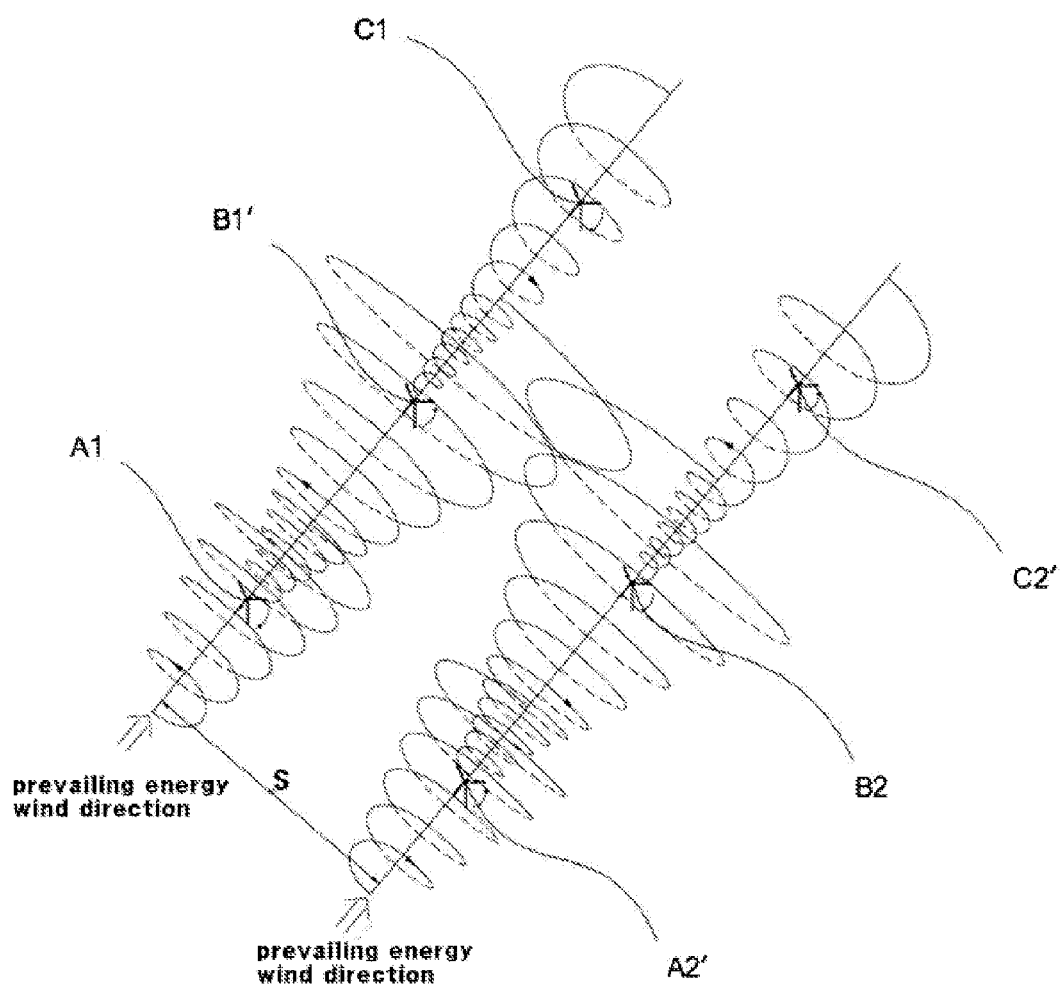
FIG. 11 is a conceptual diagram showing the intensity of a lateral interaction of transversal vortexes according to an embodiment of the present disclosure.

On this other hand, FIGS. 10 and 11 illustrate an arrangement structure of the wind power generation units according to the present disclosure, wherein the wind power generation units neighboring transversally (laterally) are arranged in such a way as to rotate in the opposite direction to each other.

Figure 10A:
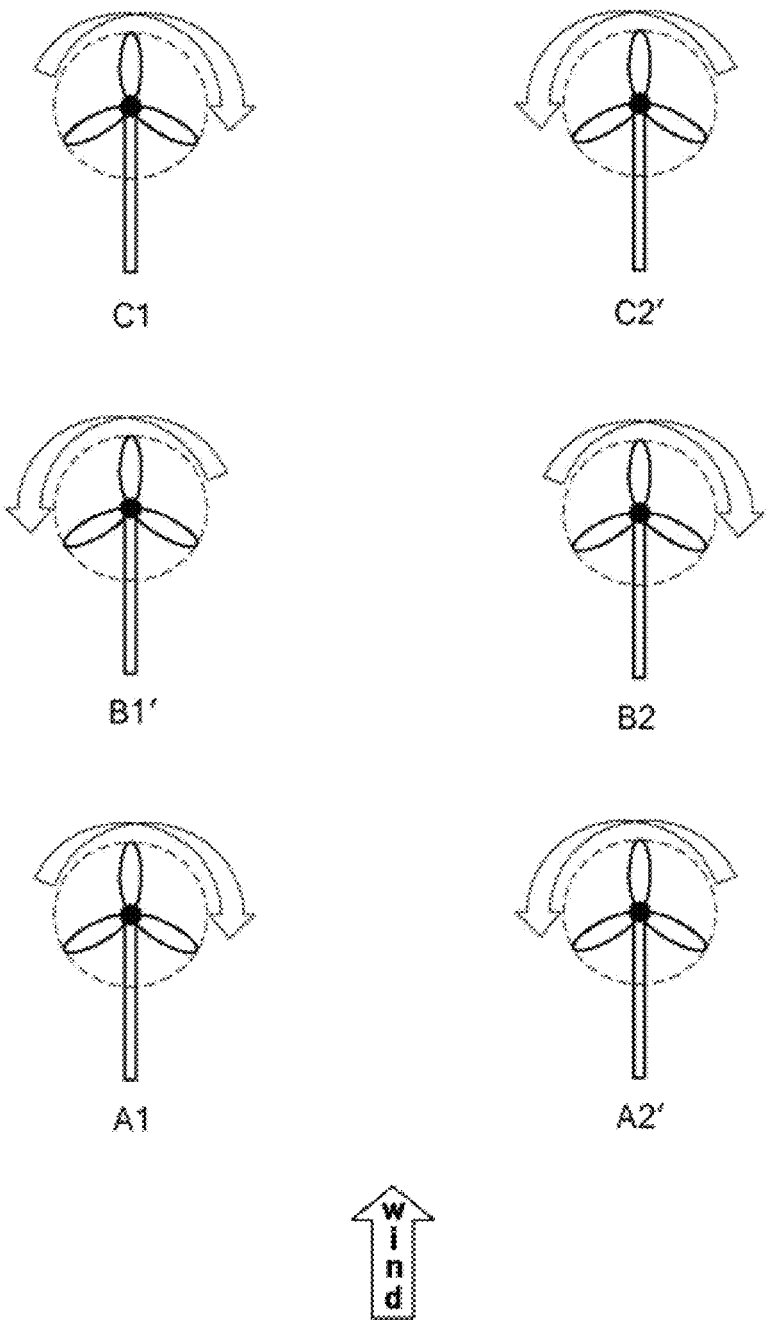

FIG. 10A is an arrangement diagram showing that the wind power generation units are arranged in the transversal (lateral) direction in the wind farm according to an embodiment of the present disclosure, wherein a second-direction wind power generation unit A2' is arranged at the right of the first-direction wind power generation unit A1, and a first-direction wind power generation unit B2 is arranged at the right of the second-direction wind power generation unit B1', such that the wind power generation units which are opposed to each other in rotational direction are alternately arranged adjacent to each other in the transversal (lateral) direction.

In FIG. 11, when the wind power generation units whose blades rotate in the opposite direction to each other are arranged in the transversal (lateral) direction, a spiral flow which is opposed to the rotational direction of each wind power generation unit is generated at the rear of the wind power generation unit. If the transversal (lateral) interval from the wind power generation units is narrow, the spiral flow collides against a laterally adjacent spiral flow, but it can keep the rotation direction of each flow without being tangled with each other at the colliding faces because the rotational direction is opposed, so that flow interaction is reduced and weakened. Such a phenomenon is maintained in the wind power generation units installed in the rear row in a state that the influence of the slipstream is weakened, thereby reducing the flow interaction.

Therefore, because such an arrangement can reduce or minimize the bad influence on the aerodynamic efficiency and aerodynamic vibration of the wind power generation units, it can achieve the expected aerodynamic efficiency even though the transversal (lateral) interval is shorter than the interval for the transversal (lateral) arrangement of the wind power generation units whose blades rotate in the same direction.

Moreover, if pitch control is carried out in order to increase or maximize the aerodynamic efficiency by reducing or minimizing interaction of the spiral flow according to a predetermined transversal (lateral) interval, because size and rotational strength of the spiral flow generated by the rotation of the blades can be controlled effectively, aerodynamic efficiency can be increased or maximized at a predetermined transversal (lateral) interval.

Figure 14:
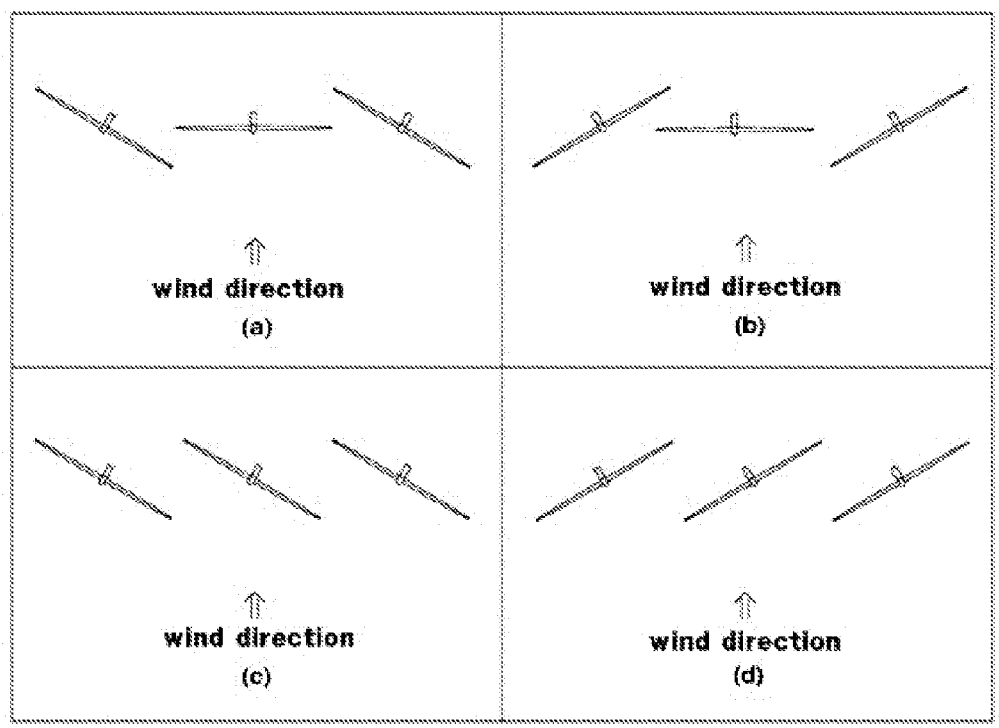
FIG. 14 is a conceptual diagram showing yaw control according to an embodiment of the present disclosure.

Furthermore, as shown in FIG. 14, because an interaction range of the spiral flow can be controlled when the directions of the rotary axes of the wind power generation units are individually and properly controlled through yaw control, embodiments of the present disclosure can reduce or prevent vibration and improve or optimize aerodynamic efficiency at a predetermined longitudinal (back and forth) interval and transversal (lateral) interval.

By the same token, the transversal (lateral) arrangement of the wind power generation units whose blades rotate in the same direction may keep a sufficient transversal (lateral) interval from the wind power generation units installed laterally, but the transversal (lateral) interval can be reduced or minimized in the wind power generation units which are installed in the transversal (lateral) arrangement because the rotational direction is set in the opposite direction to the wind power generation units neighboring laterally and an interaction range of the spiral flow can be controlled through pitch control and yaw control, so that the number of the wind power generation units installed in a limited wind farm area can be increased or maximized.

Figure 12:
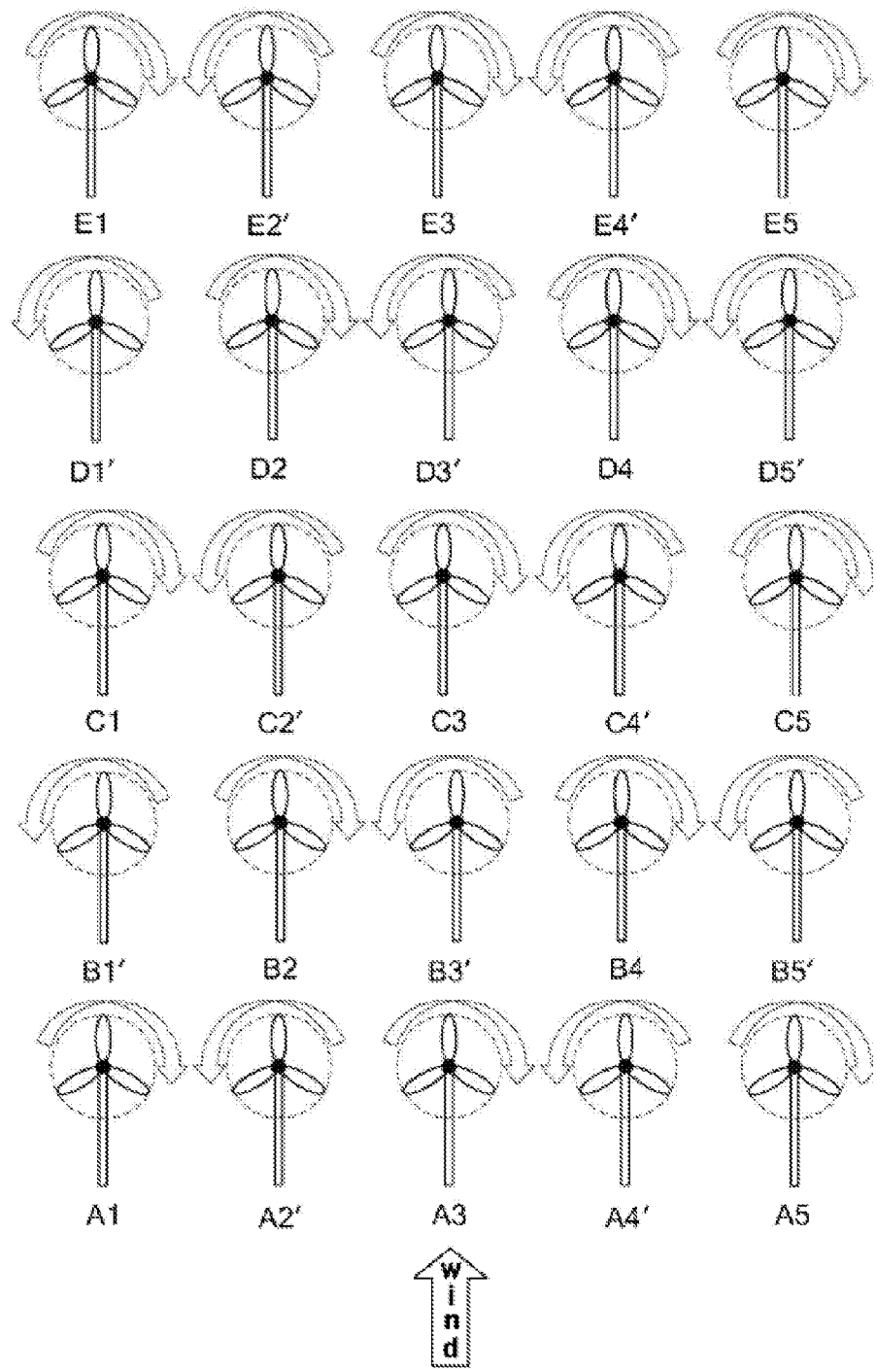
FIG. 12 is an arrangement diagram showing a wind farm according to an embodiment of the present disclosure.

FIG. 12 shows a combination of the longitudinal (back and forth) arrangement of FIG. 7 is applied in many rows and the transversal (lateral) arrangement of FIG. 10 that is applied in many lines.

In other words, in FIGS. 7 and 10, the wind power generation units are arranged in such a way as to be rotated in the opposite directions to the wind power generation units which are located at the front, rear, left and right sides based on the corresponding wind power generation unit, so as to simultaneously reduce interaction of the longitudinal (back and forth) and transversal (lateral) vortexes.

Referring to C3 which is located at the center, blades of B3' which is located at front, D3' which is located at the rear, C2' which is located at the left, and C4' which is located at the right are all rotated in the opposite direction, and such a rotation is commonly applicable to all of the wind power generation units shown in FIG. 12.

In FIG. 12, the second-direction wind power generation units B1' and A2' are respectively arranged at the rear and at the right of the first-direction wind power generation unit A1, and the first-direction wind power generation units C1 and B2 are respectively arranged at the rear and the right of the second-wind power generation unit B1', such that the first-direction wind power generation units and the second-direction wind power generation units are alternately arranged adjacent to one another.

Here, A1, A2', A3, A4' and A5 indicate some of the wind power generation units conceptually but may be expanded to A6', A7, . . . in the transversal (lateral) direction. In like manner, A1, B1', C1, D1' and E1 indicate some of the wind power generation units conceptually but may be expanded to F1', G1, . . . in the longitudinal (back and forth) direction.

Figure 1:
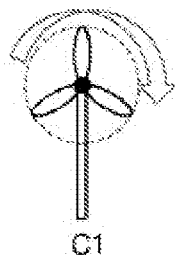
FIG. 1 is a plan view of a wind farm.
Figure 1:
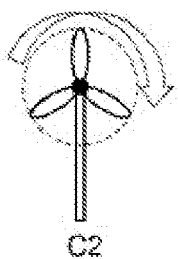
Figure 1:
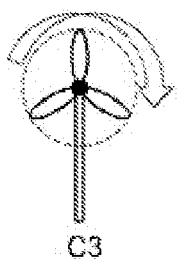
Figure 1:
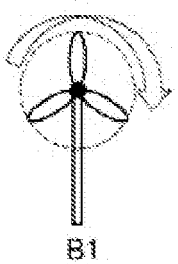
Figure 1:
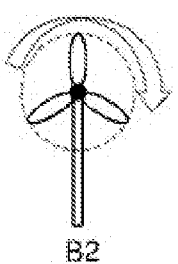
Figure 1:
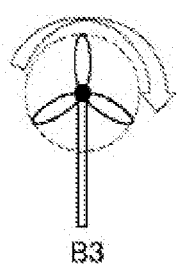
Figure 1:
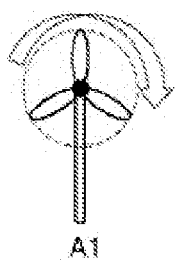
Figure 1:
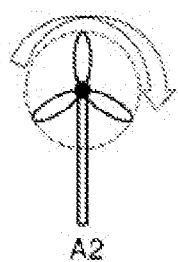
Figure 1:
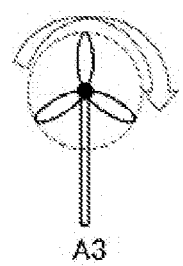
Figure 1:
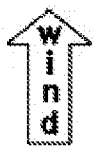

Therefore, the longitudinal (back and forth) intervals among A1, B1 and C1 and the transversal (lateral) intervals among A1, A2 and A3 which do not include the second-direction wind power generation unit in FIG. 1 may become dense when the first-direction wind power generation units and the second-direction wind power generation units are alternately arranged adjacent to one another as shown in FIG. 12.

Figure 13:
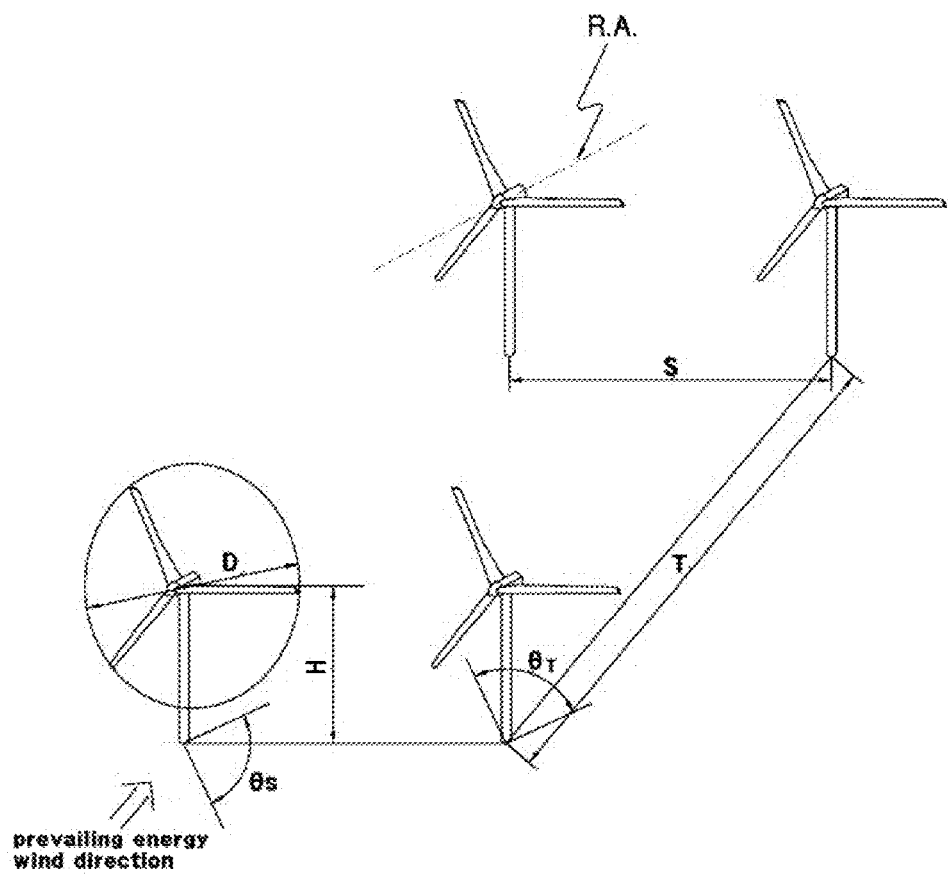
FIG. 13 is a conceptual diagram showing a longitudinal arrangement angle ($\theta T$), a transversal arrangement angle ($\theta s$), a longitudinal arrangement interval (T), a transversal arrangement interval (S), a rotor diameter (D) and a rotation axis height (H) of wind power generation units in a wind farm according to an embodiment of the present disclosure.

FIG. 13 illustrates a range of deployment of the wind power generation units based on a line that projects the rotational axis on a plane or based on the prevailing energy wind direction, and wherein the rotation axis of each of the wind power generation units which are arranged in the wind farm is defined as R.A.

$\theta_T$ indicates a longitudinal (back and forth) deploy angle of the neighboring wind power generation units, $\theta_s$ indicates a transversal (lateral) deploy angle of the wind power generation units, T indicates a longitudinal (back and forth) interval, S indicates a transversal (lateral) interval, D indicates a rotor diameter, and H indicates a height of the rotation axis.

Figure 13A:
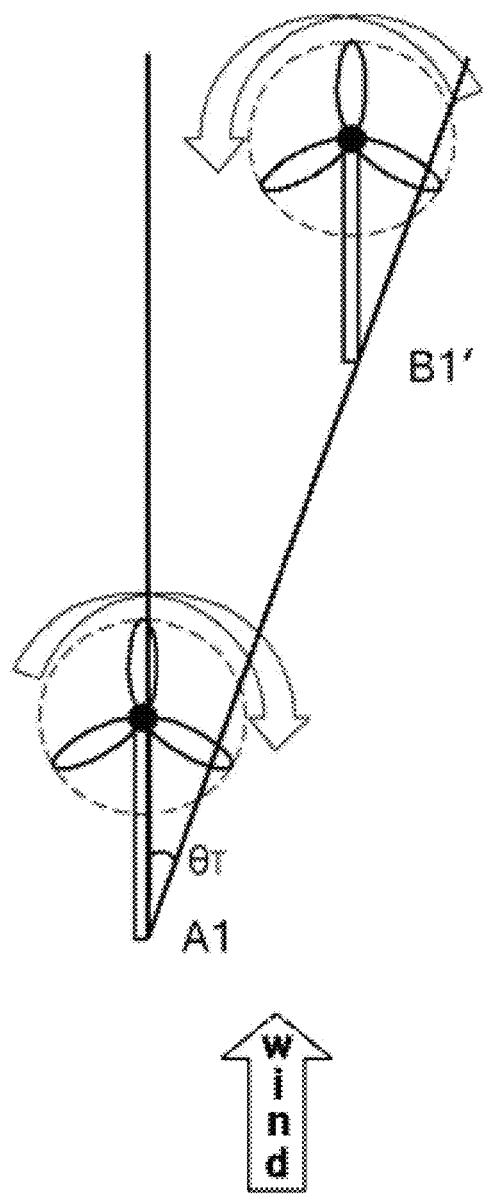
FIGS. 13A to 13F show an arrangement method of wind power generation units according to an embodiment of the present disclosure.
Figure 13B:
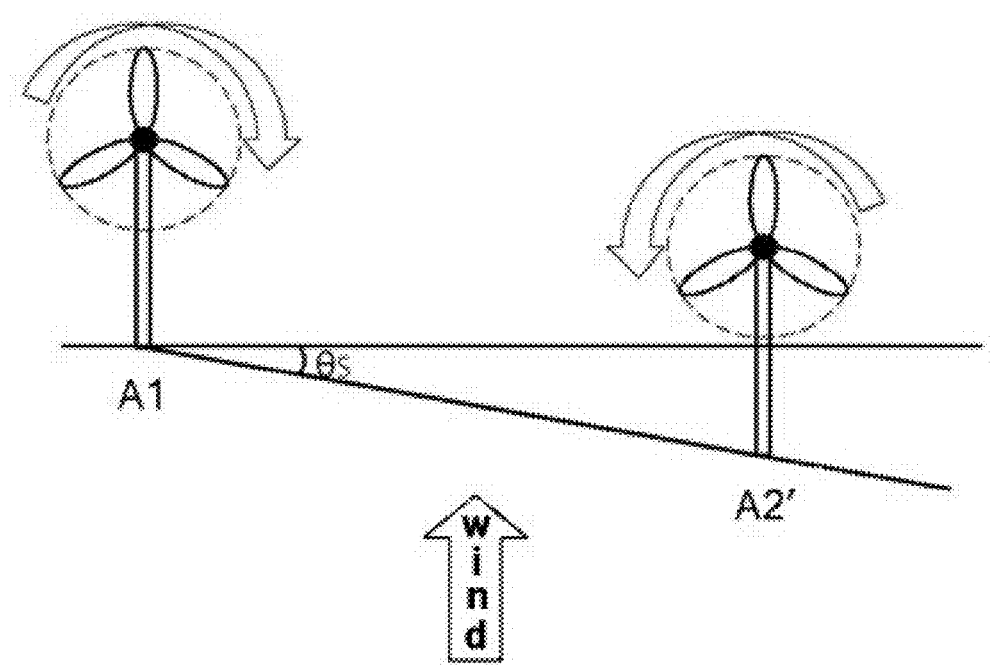

FIGS. 13A and 13B show that the longitudinal (back and forth) deploy angle $\theta_T$ implies that the wind power generation units can be arranged below 45° right and left from the vertical line of the prevailing energy wind direction, and the transversal (lateral) deploy angle $\theta_s$ implies that the wind power generation units can be arranged below 45° right and left from the horizontal line which is perpendicular to the prevailing energy wind direction.

Figure 13C:
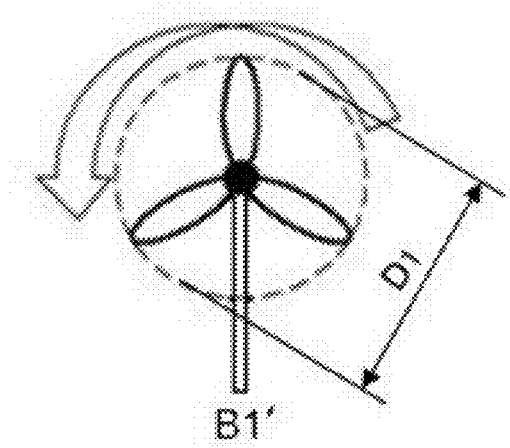
Figure 13C:
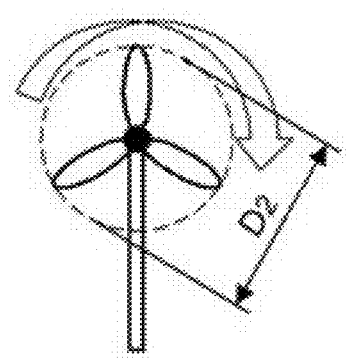
Figure 13C:
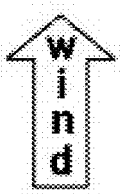
Figure 13D:
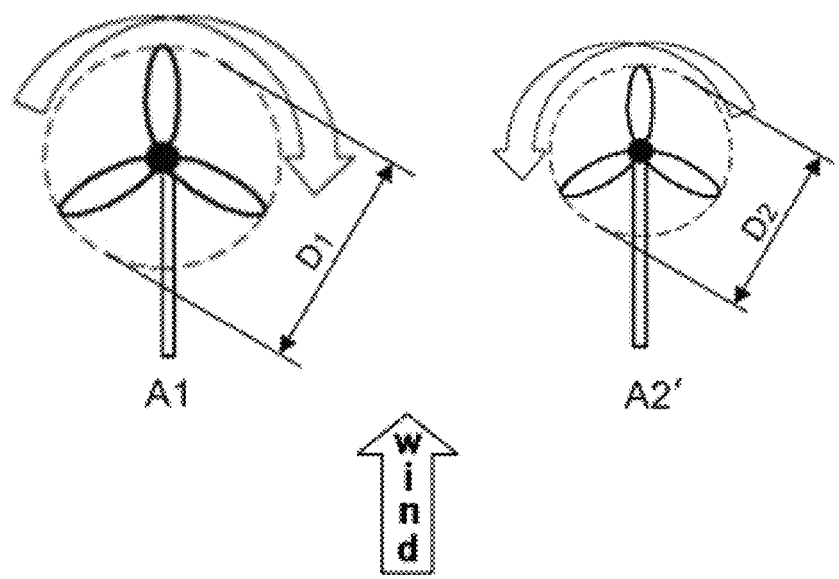
Figure 13E:
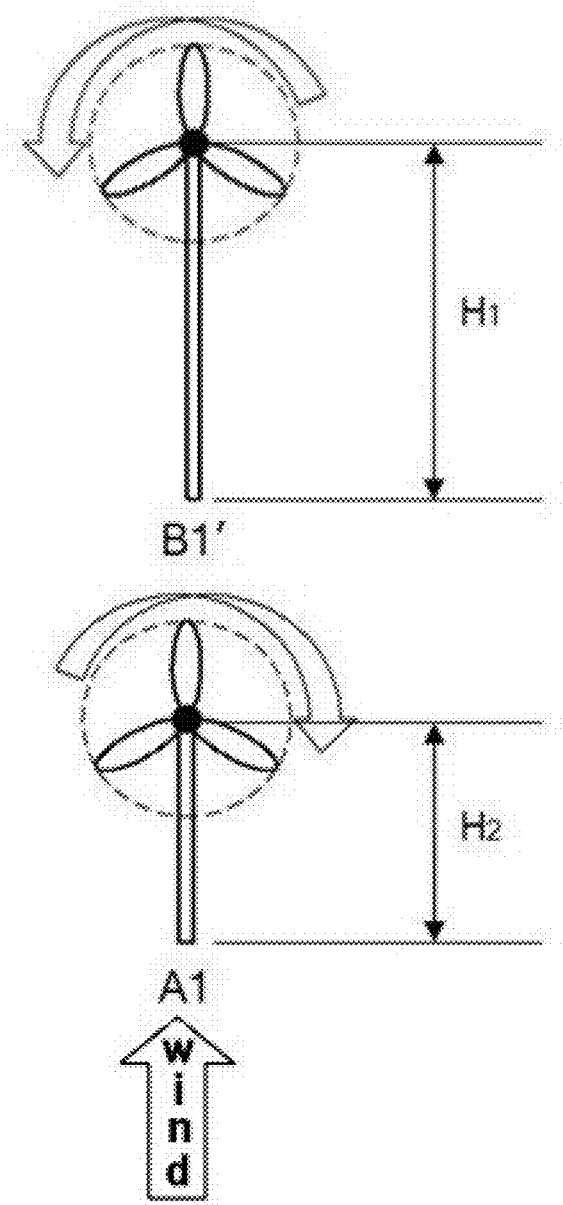
Figure 13F:
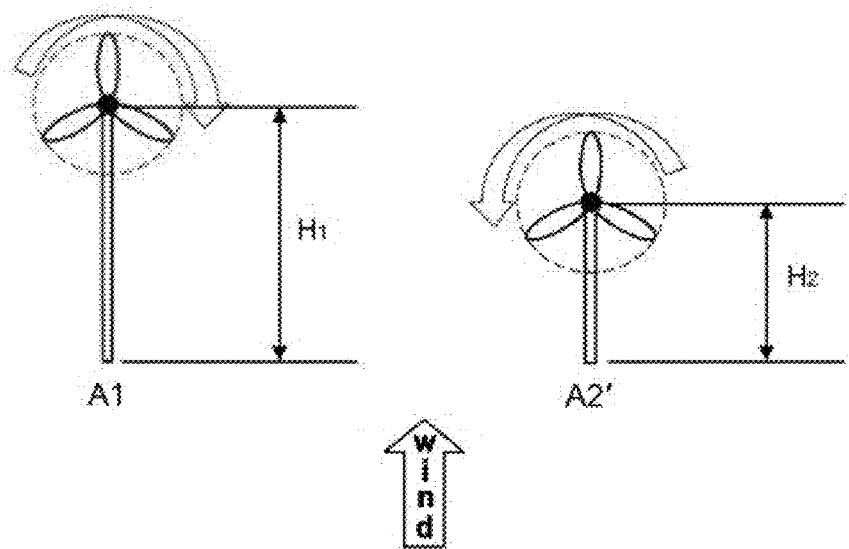

FIGS. 13C and 13D show a method for arranging the wind power generation units having various rotor diameters in the wind farm. Here, A1 and B1' and A1 and A2' indicate some of the wind power generation units conceptually, and may be expanded in back and forth or left and right directions and their positions may be changed in back and forth or left and right directions.

FIGS. 13C and 13D show a method for arranging the wind power generation units having the rotation axis with different heights in the wind farm. Here, A1 and B1' and A1 and A2' indicate some of the wind power generation units conceptually, and may be expanded in back and forth or left and right directions and their positions may be changed in back and forth or left and right directions.

FIG. 14 is a conceptual diagram showing a method for reducing or minimizing the vortex interaction due to the spiral flow generated by the neighboring wind power generation units arranged in the back and forth direction or in the lateral direction in the wind farm through yaw control to individually and properly rotate the rotary axes of the wind power generation units in the lateral direction, and the arrangement of the wind power generation units may be expanded in the back and forth rows or the lateral columns.

The attached drawings conceptually and partially show the arrangement relations of the wind power generation units for describing embodiments of the present disclosure, and hence, the arrangement relations may be varied according to the structural specification of the wind power generation units and geographical, climatic and environmental conditions of the installation site of the wind power generation units.

Additionally, unless otherwise defined herein, it will be understood that all words or terms used in the specification and claims should be interpreted as the meaning defined in commonly used dictionaries in the art. It will be further understood that the words or terms should be interpreted as having a meaning that is consistent with their meaning in the context of the relevant art and the technical idea of the invention, and should not be interpreted as excessively ideal or formal meaning unless otherwise defined clearly.

While the present invention has been particularly shown and described with reference to the preferred embodiments thereof, it will be understood by those of ordinary skill in the art that simple combinations of the preferred embodiments of the present invention with the conventional inventions or the prior arts or simple modifications of the present invention various changes and modifications belong to the technical scope of the present invention. Further, the embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A wind farm, comprising
a plurality of wind power generation units, each wind power generation unit including:
a rotation axis;
a hub located at a first end portion of the rotation axis;
at least two airfoil blades radially mounted on the hub;
a pitch control system configured to adjust a pitch angle of the blades mounted on the hub; and
a yaw control system configured to horizontally rotate the rotation axis to adjust a direction of the rotation axis with respect to a prevailing energy wind direction, wherein
at least two first-direction wind power generation units are spaced apart longitudinally from each other along the prevailing energy wind direction at a predetermined interval and whose blades are rotated in a same direction, and
at least one second-direction wind power generation unit is located between the first-direction wind power generation units and has blades rotating in an opposite direction to a rotational direction of the blades of the first-direction wind power generation units.

2. The wind farm according to claim 1, wherein
a wind power generation unit arranged at a rear from a wind power generation unit arranged at a front is located within a longitudinal deploy angle ($\theta T$) range of 0° to 45° right or left from a vertical line of the wind power generation unit arranged at the front extending in the direction of the prevailing energy wind direction.

3. The wind farm according to claim 2, wherein a longitudinal interval of the wind power generation units from their base is two to seven times shorter than a rotor diameter (D) of the wind power generation unit arranged at the front.

4. The wind farm according to claim 1, wherein
a wind power generation unit arranged at a side of a wind power generation unit arranged at a reference point is located within a transversal deploy angle ($\theta s$) range of 0° to 45° above or below a horizontal line from the wind power generation unit arranged at the reference point that is perpendicular to the prevailing energy wind direction.

5. The wind farm according to claim 4, wherein a transversal interval of the wind power generation units is two to four times shorter than a smallest rotor diameter (D) of the wind power generation unit arranged at the reference point.

6. The wind farm according to claim 1, wherein a rotor diameter (D) of the at least one of the first-direction wind power generation unit is different than the second-direction wind power generation unit.

7. The wind farm according to claim 1, wherein a rotational axis height (H) of the at least one of the first-direction wind power generation unit is different than the second-direction wind power generation unit.

8. The wind farm according to claim 1, wherein a yaw of at least one of the wind power generation units is controlled differently from a horizontal direction of the rotation axis of another wind power generation unit.

9. The wind farm according to claim 1, wherein
at least two first-direction wind power generation units are spaced apart transversely from each other at a predetermined interval, and
at least one second-direction wind power generation unit whose blade is rotated in an opposite direction to the rotational direction of the first-direction wind power generation units is located between the transversely spaced apart first-direction wind power generation units.

10. The wind farm according to claim 9, wherein a rotor diameter (D) of the at least one second-direction wind power generation unit located between the first-direction wind power generation units transversely spaced apart is different than a rotor diameter of one of the first-direction wind power generation units adjacent thereto.

11. The wind farm according to claim 9, wherein a rotation axis height (H) of the at least one second-direction wind power generation unit located between the first-direction wind power generation units transversely spaced apart is different than a rotation axis height of one of the first-direction wind power generation units adjacent thereto.

12. The wind farm according to claim 9, wherein at least one of the first-direction wind power generation units or the second-direction wind power generation unit transversely spaced apart from each other is yaw-controlled differently from a horizontal direction of the rotation axis of another wind power generation unit.

13. A wind farm, comprising:
a first wind power generation unit having blades that rotate in a counterclockwise direction, and
a second wind power generation unit arranged longitudinally adjacent to the first wind power generation unit in a prevailing energy wind direction, the second wind power generation unit having blades that rotate in a clockwise direction.

* * * * *